US011378391B2

(12) United States Patent
Do et al.

(10) Patent No.: US 11,378,391 B2
(45) Date of Patent: Jul. 5, 2022

(54) CLOSED SPRAY TESTING CONTAINER FOR SPRAY MEASUREMENT VERIFICATION

(71) Applicant: Toyota Motor Engineering & Manufacturing North America, Inc., Plano, TX (US)

(72) Inventors: Huey Do, Walton, KY (US); Michael Troy Collins, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 349 days.

(21) Appl. No.: 16/791,382

(22) Filed: Feb. 14, 2020

(65) Prior Publication Data

US 2021/0254971 A1 Aug. 19, 2021

(51) Int. Cl.
*G01B 3/14* (2006.01)
*G01B 11/26* (2006.01)
*B05B 12/08* (2006.01)

(52) U.S. Cl.
CPC ............ *G01B 11/26* (2013.01); *B05B 12/082* (2013.01)

(58) Field of Classification Search
CPC ............ G01B 3/04; G01B 3/14; G01B 11/02
USPC .............................. 33/228, 483, 563, 565, 566
See application file for complete search history.

(56) References Cited

U.S. PATENT DOCUMENTS

| | | | | |
|---|---|---|---|---|
| 4,573,302 A | * | 3/1986 | Caretto | ...................... E04B 1/35 52/741.15 |
| 5,195,249 A | * | 3/1993 | Jackson | .............. E04F 21/0076 33/528 |
| 5,791,062 A | * | 8/1998 | Walker | ................... D05B 97/12 33/565 |
| 6,031,614 A | * | 2/2000 | Michaelis | .............. G01B 11/02 356/369 |
| 6,216,354 B1 | * | 4/2001 | Carbone | ................. B43L 13/20 33/565 |
| 6,219,930 B1 | * | 4/2001 | Reid | ...................... G06Q 40/02 33/1 BB |
| 6,796,000 B2 | | 9/2004 | Varner | |

(Continued)

FOREIGN PATENT DOCUMENTS

| | | |
|---|---|---|
| CN | 104399884 A | 3/2015 |
| CN | 208883990 U | 5/2019 |
| WO | 2006112118 A1 | 10/2006 |

OTHER PUBLICATIONS

Advanced Spray Pattern and Pressure Distribution Testing (https://www.pcimag.com/articles/103153-advanced-spray-pattern-and-pressure-distribution-testing); accessed Mar. 2, 2017.

*Primary Examiner* — George B Bennett
(74) *Attorney, Agent, or Firm* — Dinsmore & Shohl LLP

(57) ABSTRACT

A method of verifying measurements of a spray pattern from a nozzle is provided. The method includes inserting the nozzle through an opening in a bottom wall of a closed spray testing container. The closed spray testing container includes a pair of side walls and a pair of end walls connected to the side walls. A top wall is opposite the bottom wall and is connected to the pair of side walls and the pair of end walls to provide a volume. The top wall is transparent. The bottom wall includes at least one of a scale and a spray pattern representation provided on a surface of the bottom wall. At least one of the scale and the spray pattern is used to verify a spray pattern provided using the nozzle.

17 Claims, 4 Drawing Sheets

(56) References Cited

U.S. PATENT DOCUMENTS

| | | | | |
|---|---|---|---|---|
| 6,854,189 B2* | 2/2005 | Schafer | ............... | B43L 12/00 |
| | | | | 33/562 |
| 8,408,150 B1* | 4/2013 | Ragan | ............... | D05B 97/00 |
| | | | | 112/136 |
| 9,500,463 B2* | 11/2016 | Killingbeck | ............. | G01B 5/25 |
| 9,969,056 B2* | 5/2018 | Yang | ............... | G01B 11/27 |
| 10,027,937 B1* | 7/2018 | Staton | ............... | G01B 11/02 |
| 2020/0182598 A1* | 6/2020 | Lowitz | ............... | G01B 5/08 |

\* cited by examiner

CLOSED SPRAY TESTING CONTAINER FOR SPRAY MEASUREMENT VERIFICATION

TECHNICAL FIELD

The present specification generally relates to closed spray testing containers for spray measurement verification and methods of verifying spray measurements.

BACKGROUND

Wax may be applied to areas of a vehicle in order to inhibit damage due to wear and tear over time. In some instances, the wax may be sprayed using nozzles into certain regions of the vehicle that are susceptible to wear, such as within rocker panels that are near to the road and other locations. The nozzles may become worn and clogged over time with repeated usage. Worn or clogged nozzles may provide a spray pattern that does not meet desired measurements. However, changes in the spray pattern can be difficult to detect visually. Further, cleaning of the wax from a surface used for a test can be difficult and time-consuming. The wax may also migrate and cover unintended surfaces, which may be difficult to detect and clean.

What is needed is a closed spray testing container for spray measurement verification.

SUMMARY

In one embodiment, a method of verifying measurements of a spray pattern from a nozzle is provided. The method includes inserting the nozzle through an opening in a bottom wall of a closed spray testing container. The closed spray testing container includes a pair of side walls and a pair of end walls connected to the side walls. A top wall is opposite the bottom wall and is connected to the pair of side walls and the pair of end walls to provide a volume. The top wall is transparent. The bottom wall includes at least one of a scale and a spray pattern representation provided on a surface of the bottom wall. At least one of the scale and the spray pattern is used to verify a spray pattern provided using the nozzle.

In another embodiment, a closed spray testing container includes a pair of side walls and a pair of end walls connected to the side walls. A bottom wall is connected to the pair of side walls and the pair of end walls. A top wall is opposite the bottom wall and is connected to the pair of side walls and the pair of end walls to provide a volume. The top wall is transparent. The bottom wall includes at least one of a scale and a spray pattern representation provided on a surface of the bottom wall.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present description is generally directed to a closed spray testing container into which a spray nozzle can be inserted and sprayed to measure dimensions of the spray pattern. The spray testing container may be considered closed in that the container includes opposite side walls, opposite end walls, a top wall and a bottom wall. The top wall may be transparent in order to allow viewing of the spray pattern applied to the bottom wall of the closed container. In some embodiments, the side walls and end walls may also be transparent. The bottom wall may be tinted in order to emphasize a measurement pattern applied to an interior surface of the bottom wall. The measurement pattern may include a longitudinal scale and a lateral scale. Both the longitudinal scale and the lateral scale may include marks that represent a distance. Further, a spray pattern representation may be provided on the interior surface of the bottom wall. The spray pattern representation may be used to further verify the spray pattern.

Figure 1:
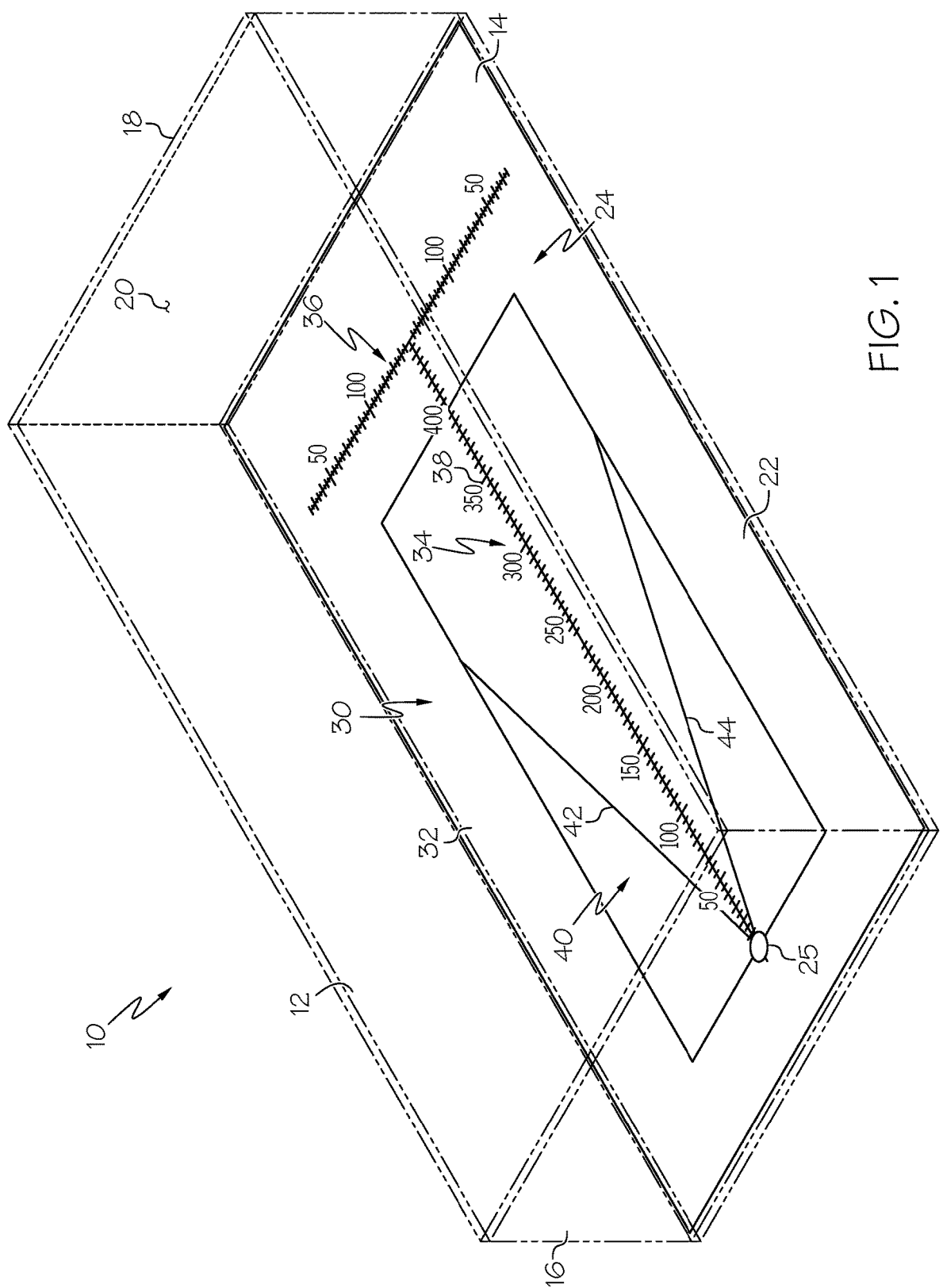
FIG. 1 is a perspective view of a closed spray testing container, according to one or more embodiments shown and described herein.

Referring to FIG. 1, a closed spray testing container 10 includes opposite side walls 12 and 14 and opposite end walls 16 and 18 that are connected to the side walls 12 and 14. The closed spray testing container 10 further includes a top wall 20 and an opposite bottom wall 22 that are connected to the side walls 12, 14 and end walls 16, 18 to form a closed box-shaped volume 24. The box-shaped volume may correspond to a particular region of the vehicle, such as within a rocker panel. An opening 25 is provided through the bottom wall 22. The opening 25 is sized to allow a nozzle to be inserted through the opening 25 and into the volume 24 for a spray measurement verification.

The side walls 12 and 14, end walls 16 and 18 and top and bottom walls 20 and 22 may be formed of any suitable material, such as plastic (e.g., polycarbonate). The top wall 20 may be transparent. An object is transparent if the object transmits light without appreciable scattering so that items are seen clearly through the object. The side walls 12 and 14 and end walls 16 and 18 may also be transparent. The bottom wall 22 may be tinted opaque, such as tinted black, to facilitate viewing of the spray pattern once the spray is applied.

Figure 2:
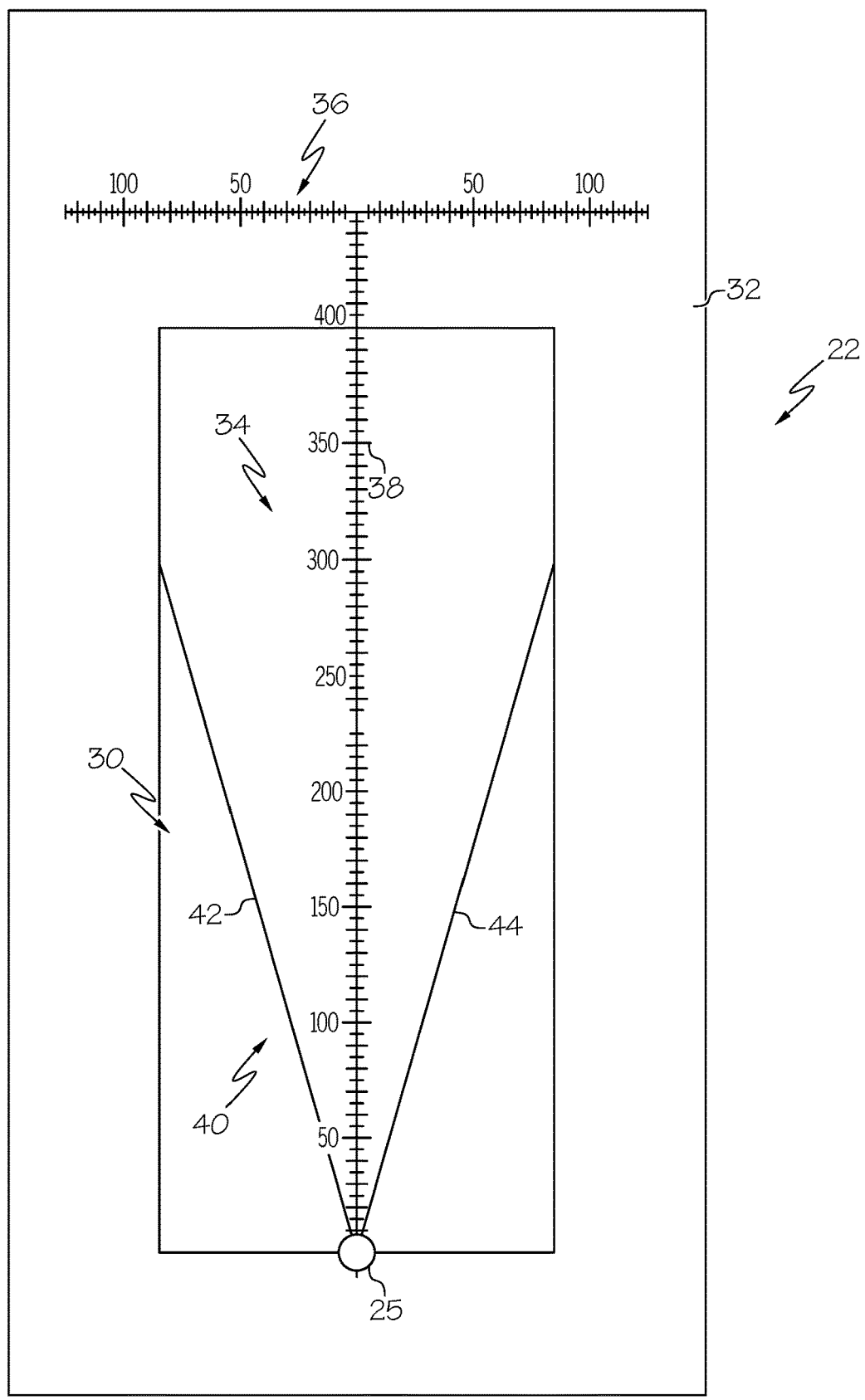
FIG. 2 is a plan view of a bottom wall of the closed spray testing container of FIG. 1, according to one or more embodiments shown and described herein.

Referring also to FIG. 2, the bottom wall 22 may also be tinted in order to emphasize a measurement pattern 30 applied (e.g., printed) to an interior surface 32 of the bottom wall 22. The measurement pattern 30 may include a longitudinal scale 34 and a lateral scale 36. Both the longitudinal scale 34 and the lateral scale 36 may include marks 38 that represent a distance. In the illustrated embodiment, the marks represent millimeters, however inches may be represented. Further, a spray pattern representation 40 may be provided on the interior surface 32 of the bottom wall 22. The spray pattern representation 40 may be used to further verify the shape of the spray pattern. For example, the spray pattern representation 40 may include diverging perimeter lines 42 and 44 that diverge from the opening 25 to represent a desired fan shape.

Figure 3:
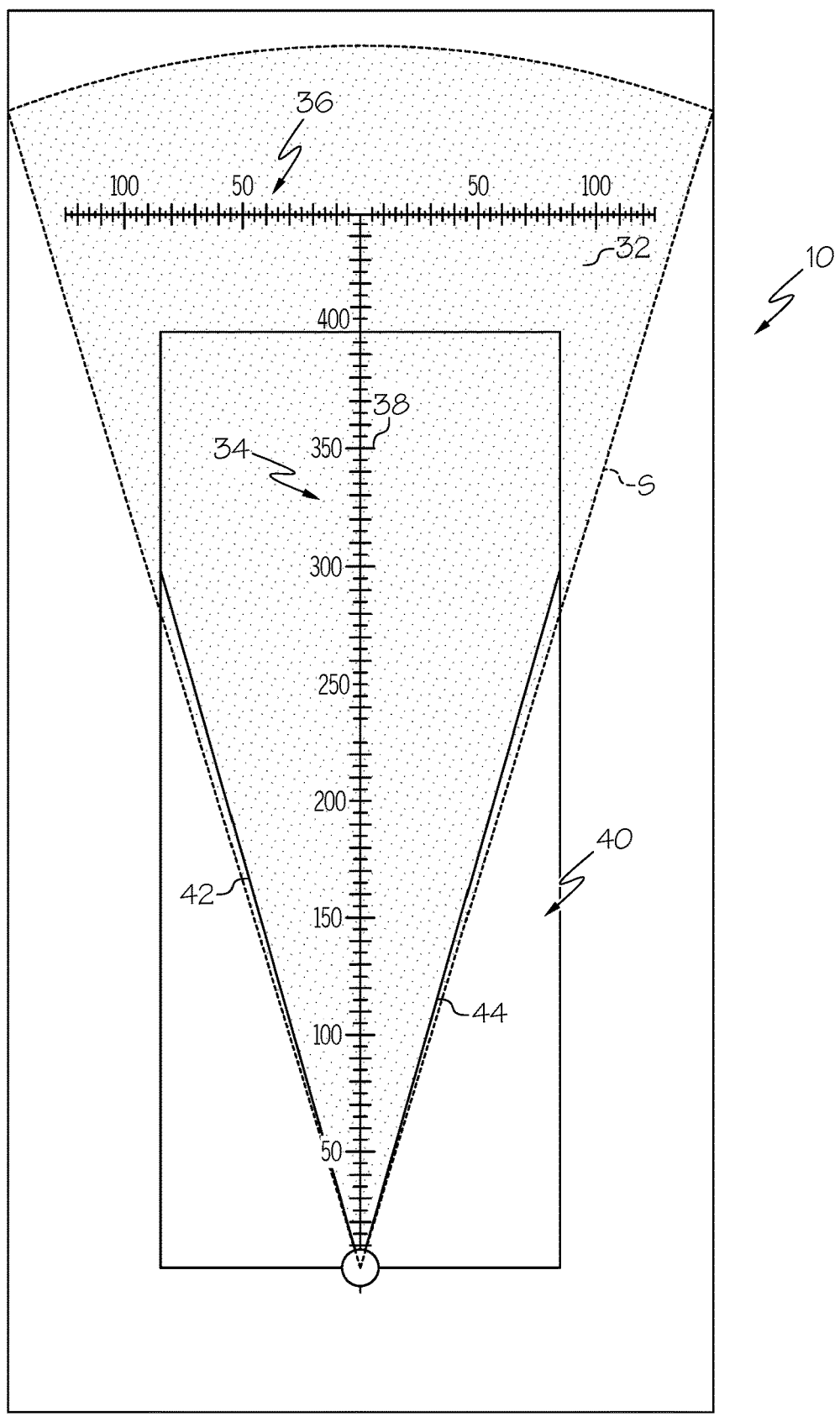
FIG. 3 is a plan view of the closed spray testing container of FIG. 1 in use, according to one or more embodiments shown and described herein.

FIG. 3 illustrates the closed spray testing container 10 in use with a spray pattern S located on the bottom wall 22. As represented, a perimeter 46 of the spray pattern S is shown as nearly following the spray pattern representation 40. Also, the spray pattern S extends further than the longitudinal scale 34 and is wider than the lateral scale 36 which can represent an in-parameter spray pattern. In instances where the spray pattern S is shorter than the longitudinal scale 34 and narrower than the lateral scale 36, the marks 38 can be used to measure whether an out-of-parameter condition exists. After the test is complete, the top wall 20 may be removed and the bottom wall 22 may be cleaned of the spray pattern. In some embodiments, the spray pattern may be formed using a spray wax.

Figure 4:
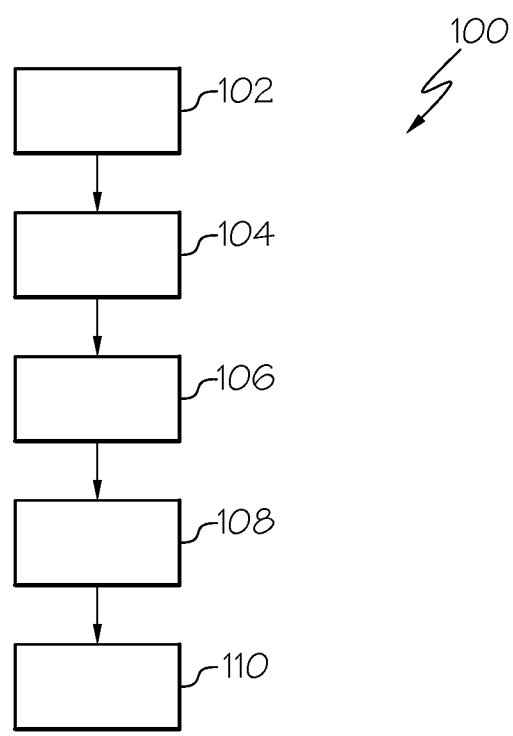
FIG. 4 illustrates a method of verifying one or both of dimensions and shape of a spray pattern using the closed spray testing container of FIG. 1, according to one or more embodiments shown and described herein.

Referring to FIG. 4, a method 100 of verifying one or both of dimensions and shape of a spray pattern is shown. At step 102, a spray nozzle of a wax spray gun is inserted through the opening of the bottom wall of the closed spray testing container. At step 104, the spray nozzle is aligned with the spray pattern representation and the longitudinal scale. The wax spray gun is then activated to create a spray pattern on the interior surface of the bottom wall at step 106. At step 108, the length and width of the spray pattern is determined. At step 110, an overall shape of the spray pattern is verified using the spray pattern representation.

The above described closed spray testing containers provide a closed volume in which a spray pattern can be measured to determine if an out-of-parameter condition exists. The closed spray testing containers may include various indicia, such as longitudinal and lateral scales that can be used to determine both length and breadth of the spray pattern. The closed spray testing containers may also include a spray pattern representation that can be used to provide an overall indication of a desired shape of the spray pattern.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of verifying measurements of a spray pattern from a nozzle, the method comprising:
    inserting the nozzle through an opening in a bottom wall of a closed spray testing container, the closed spray testing container comprising:
        a pair of side walls;
        a pair of end walls connected to the side walls; and
        a top wall opposite the bottom wall and connected to the pair of side walls and the pair of end walls to provide a volume, wherein the top wall is transparent;
        wherein the bottom wall comprises at least one of a scale and a spray pattern representation provided on a surface of the bottom wall; and
    using the at least one of the scale and the spray pattern to verify a spray pattern provided using the nozzle.

2. The method of claim 1, wherein the bottom wall comprises both the scale and the spray pattern representation.

3. The method of claim 2 further comprising printing the scale and the spray pattern representation of the surface of the bottom wall.

4. The method of claim 1, wherein the bottom wall is opaque.

5. The method of claim 3, wherein the bottom wall is tinted black.

6. The method of claim 1, wherein the pair of side walls and the pair of end walls are transparent.

7. The method of claim 1, wherein the scale is a longitudinal scale, the closed spray testing container further comprising a lateral scale on the surface of the bottom wall.

8. The method of claim 1, wherein the spray gun is a wax spray gun and the spray pattern comprises a wax.

9. A closed spray testing container comprising:
    a pair of side walls;
    a pair of end walls connected to the side walls;
    a bottom wall connected to the pair of side walls and the pair of end walls; and
    a top wall opposite the bottom wall and connected to the pair of side walls and the pair of end walls to provide a volume, wherein the top wall is transparent;
    wherein the bottom wall comprises at least one of a scale and a spray pattern representation provided on a surface of the bottom wall.

10. The closed spray testing container of claim 8, wherein the bottom wall has an opening that is sized to receive a nozzle of a spray gun.

11. The closed spray testing container of claim 9, wherein the bottom wall comprises both the scale and the spray pattern representation.

12. The closed spray testing container of claim 11, wherein the scale and the spray pattern representation are printed of the surface of the bottom wall.

13. The closed spray testing container of claim 9, wherein the bottom wall is opaque.

14. The closed spray testing container of claim 13, wherein the bottom wall is tinted black.

15. The closed spray testing container of claim 9, wherein the pair of side walls and the pair of end walls are transparent.

16. The closed spray testing container of claim 9, wherein the scale is a longitudinal scale, the closed spray testing container further comprising a lateral scale on the surface of the bottom wall.

17. The closed spray testing container of claim 16, wherein the longitudinal scale and the lateral scale comprises marks that provide an indication of distance.

* * * * *